United States Patent

Kimura et al.

(10) Patent No.: US 8,247,483 B2
(45) Date of Patent: Aug. 21, 2012

(54) ROTATION MOLDED BODY

(75) Inventors: Yoshikazu Kimura, Osaka (JP); Ryoji Soma, Toyonaka (JP); Natsuko Sato, Sakai (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 4 days.

(21) Appl. No.: 12/633,851

(22) Filed: Dec. 9, 2009

(65) Prior Publication Data

US 2010/0152343 A1 Jun. 17, 2010

(30) Foreign Application Priority Data

Dec. 12, 2008 (JP) ................. 2008-316756

(51) Int. Cl.
*C08K 5/524* (2006.01)
(52) U.S. Cl. ....... 524/117; 524/147
(58) Field of Classification Search ........ 524/117, 524/147
See application file for complete search history.

(56) References Cited

U.S. PATENT DOCUMENTS

| | | | | |
|---|---|---|---|---|
| 2002/0156162 A1* | 10/2002 | Stadler | ............ | 524/190 |
| 2008/0262124 A1* | 10/2008 | Kimura et al. | ............ | 523/351 |

FOREIGN PATENT DOCUMENTS

JP 2000-248075 A 9/2000
* cited by examiner

*Primary Examiner* — Ling Choi
*Assistant Examiner* — Wenwen Cai
(74) *Attorney, Agent, or Firm* — Birch, Stewart, Kolasch & Birch, LLP

(57) ABSTRACT

A rotation molded body obtained by rotation molding of a polyolefin composition comprising a polyolefin and a phosphite of the formula (I).

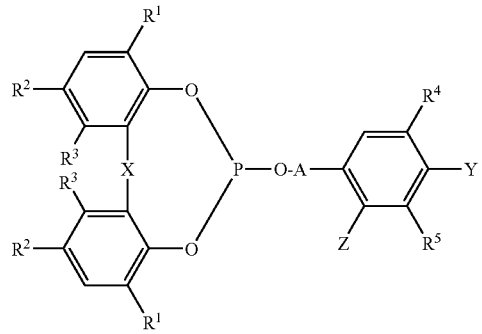

(I)

4 Claims, No Drawings

ROTATION MOLDED BODY

TECHNICAL FIELD

The present invention relates to a rotation molded body obtained by rotation molding of a polyolefin composition.

BACKGROUND ART

Rotation molded bodies are widely used as large size molded articles, vessels, tanks and the like used in the industrial fields such as automobile, electricity, house building material, civil engineering, agriculture, horticulture, forestry, fishery and environmental applications and the like. As the production method thereof, there is mentioned, for example, a method in which, first, a polyolefin composition for rotation molded body containing a polyolefin and a processing stabilizer or the like is filled in a molding die in an amount corresponding to about the half of the die, the die is closed together with another half part, then, the molding die is heated in an oven while rotating the die around the axis, and after the composition is spread on the wall surface of the molding die, the molding die is cooled, or other methods.

Patent document 1 discloses that, as the above-described processing stabilizer, tris(2,4-di-t-butylphenyl)phosphite (Irgafos 168: registered trademark, manufactured by Ciba Specialty Chemicals) of the following formula:

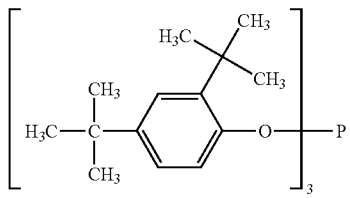

is used as one of phosphorus-based antioxidants, in a polyolefin, and yellowing of the resultant rotation molded body is suppressed.

(Patent document 1) JP-A No. 2000-248075 (Example 1A and B [0111] to [0119])

DISCLOSURE OF THE INVENTION

Recently, due to growth in size of a rotation molded body, there is a problem that heating and cooling times necessary for rotation molding are extended, and the rotation molded body is exposed under high temperature for a long period of time, leading resultantly to progress of yellowing of the resultant rotation molded body.

Under such conditions, the present inventors have found that yellowing of a rotation molded body obtained by rotation molding of a polyolefin composition containing a certain kind of phosphorus-based antioxidant is suppressed.

That is, the present invention provides the following [1] to [7].

[1]. A rotation molded body obtained by rotation molding of a polyolefin composition comprising a polyolefin and a phosphite of the formula (I):

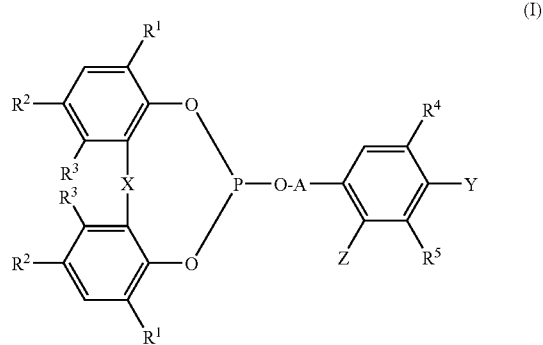

(in the formula (I), $R^1$, $R^2$, $R^4$ and $R^5$ represent each independently a hydrogen atom, alkyl group having 1 to 8 carbon atoms, cycloalkyl group having 5 to 8 carbon atoms, alkylcycloalkyl group having 6 to 12 carbon atoms, aralkyl group having 7 to 12 carbon atoms or phenyl group, $R^3$ represents a hydrogen atom or alkyl group having 1 to 8 carbon atoms, X represents a single bond, sulfur atom or —$CHR^6$— group ($R^6$ represents a hydrogen atom, alkyl group having 1 to 8 carbon atoms or cycloalkyl group having 5 to 8 carbon atoms), A represents an alkylene group having 1 to 8 carbon atoms or *—$COR^7$— group ($R^7$ represents a single bond or alkylene group having 1 to 8 carbon atoms, and * means that the group is a connecting bond at the oxygen side), and either one of Y and Z represents a hydroxyl group, alkoxy group having 1 to 8 carbon atoms or aralkyloxy group having 7 to 12 carbon atoms and other one represents a hydrogen atom or alkyl group having 1 to 8 carbon atoms).

[2]. The rotation molded body according to [1], wherein the polyolefin composition comprises the phosphite of the formula (I) in an amount of 0.005 to 5 parts by weight with respect to 100 parts by weight of the polyolefin.

[3]. The rotation molded body according to [1], wherein the polyolefin composition comprises the phosphite of the formula (I) in an amount of 0.05 to 1 part by weight with respect to 100 parts by weight of the polyolefin.

[4]. The rotation molded body according to [1] obtained by rotation molding of the polyolefin composition further containing tris(2,4-di-t-butylphenyl)phosphite.

[5]. The rotation molded body according to [4] obtained by rotation molding of the polyolefin composition in which the weight ratio of the phosphite to tris(2,4-di-t-butylphenyl) phosphite is 5:1 to 1:10.

[6]. The rotation molded body according to any one of [1] to [5], in which the yellowness index YI thereof is 3 or less.

[7]. A method of preventing yellowing of a rotation molded body, comprising a step of adding a phosphite of the formula (I) to a polyolefin.

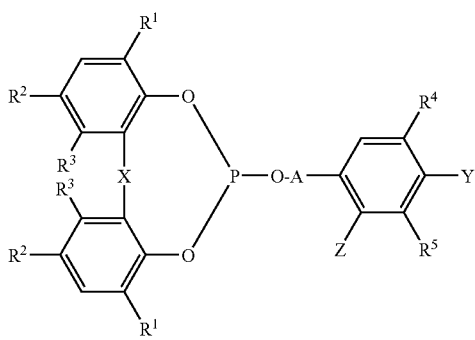

(in the formula (I), $R^1$, $R^2$, $R^4$ and $R^5$ represent each independently a hydrogen atom, alkyl group having 1 to 8 carbon atoms, cycloalkyl group having 5 to 8 carbon atoms, alkylcycloalkyl group having 6 to 12 carbon atoms, aralkyl group having 7 to 12 carbon atoms or phenyl group, $R^3$ represents a hydrogen atom or alkyl group having 1 to 8 carbon atoms. X represents a single bond, sulfur atom or —$CHR^6$— group ($R^6$ represents a hydrogen atom, alkyl group having 1 to 8 carbon atoms or cycloalkyl group having 5 to 8 carbon atoms). A represents an alkylene group having 1 to 8 carbon atoms or *—$COR^7$— group ($R^7$ represents a single bond or alkylene group having 1 to 8 carbon atoms, and * means that the group is a connecting bond at the oxygen side). Either one of Y and Z represents a hydroxyl group, alkoxy group having 1 to 8 carbon atoms or aralkyloxy group having 7 to 12 carbon atoms and other one represents a hydrogen atom or alkyl group having 1 to 8 carbon atoms).

MODES FOR CARRYING OUT THE INVENTION

The present invention will be described in detail below.

The present invention provides a rotation molded body obtained by rotation molding of a polyolefin composition containing a polyolefin and a phosphite of the above-described formula (I) (hereinafter, referred to as a phosphite (I) in some cases).

(Polyolefin)

The polyolefin used in the present invention is a polymer in which the main chain is formed with a carbon-carbon double bond, and includes, for example, propylene resins;

ethylene resins high density polyethylene (HD-PE), low density polyethylene (LD-PE), linear low density polyethylene (LLDPE), ethylene/ethyl acrylate copolymerized resin, ethylene/vinyl acetate copolymerized resin, ethylene/vinyl alcohol copolymerized resin, ethylene/methyl methacrylate copolymer and the like;

methylpentene polymers;

styrene resins such as poly(p-methylstyrene), poly(α-methylstyrene), acrylonitrile/styrene copolymerized resin, acrylonitrile/butadiene/styrene copolymerized resin, special acrylic rubber/acrylonitrile/styrene copolymerized resin, acrylonitrile/chlorinated polyethylene/styrene copolymerized resin, styrene/butadiene copolymer and the like;

halogenated polyolefins such as chlorinated polyethylene, polychloroprene, chlorinated rubber, polyvinyl chloride, polyvinylidene chloride and the like;

acrylic resins such as acrylic resin, methacrylic resin and the like;

fluorine resins;

elastomers such as 1,2-polybutadiene, polyisoprene, butadiene/acrylonitrile copolymer and the like, and more preferably mentioned are polyolefins, further preferably mentioned are ethylene resins and propylene resins, still further preferably mentioned are propylene resins.

The polyolefin used in the present invention has a MFR of preferably 5.0 g/10 min or less, more preferably 4.0 g/10 min or less.

Here, the ethylene resin means a polyolefin containing a structural unit derived from ethylene, and the resins exemplified above are mentioned.

The propylene resin means a polyolefin containing a structural unit derived from propylene. Specifically mentioned are crystalline propylene homopolymers, propylene-ethylene random copolymers, propylene-α-olefin random copolymers, propylene-ethylene-α-olefin copolymers, polypropylene block copolymers composed of a propylene homopolymer component or a copolymer component composed mainly of propylene and a copolymer component composed of propylene and ethylene and/or α-olefin, and other copolymers.

In the present invention, when propylene resins are used as the thermoplastic polymer, the propylene resins may be used singly or as a blend of two or more.

The α-olefin used in the propylene resin is usually an α-olefin having 4 to 12 carbon atoms, and examples thereof include 1-butene, 1-pentene, 1-hexene, 4-methyl-1-pentene, 1-octene, 1-decene and the like, preferably 1-butene, 1-hexene and 1-octene.

Examples of the propylene-α-olefin random copolymer include a propylene-1-butene random copolymer, propylene-1-hexene random copolymer, propylene-1-octene random copolymer and the like.

Examples of the propylene-ethylene-α-olefin copolymer include a propylene-ethylene-1-butene copolymer, propylene-ethylene-1-hexene copolymer, propylene-ethylene-1-octene copolymer and the like.

In the polypropylene block copolymer composed of a propylene homopolymer component or a copolymer component composed mainly of propylene and a copolymer component composed of propylene and ethylene and/or α-olefin, the copolymer component composed mainly of propylene includes, for example, a propylene-ethylene copolymer component, propylene-1-butene copolymer component, propylene-1-hexene copolymer component and the like, and the copolymer component composed of propylene and ethylene and/or α-olefin includes, for example, a propylene-ethylene copolymer component, propylene-ethylene-1-butene copolymer component, propylene-ethylene-1-hexene copolymer component, propylene-ethylene-1-octene copolymer component, propylene-1-butene copolymer component, propylene-1-hexene copolymer component, propylene-1-octene copolymer component and the like. In the copolymer component composed of propylene and ethylene and/or α-olefin, the content of ethylene and/or α-olefin having 4 to 12 carbon atoms is usually 0.01 to 20 wt %.

Examples of the polypropylene block copolymer composed of a propylene homopolymer component or a copolymer component composed mainly of propylene and a copolymer component composed of propylene and ethylene and/or α-olefin include a propylene-ethylene block copolymer, (propylene)-(propylene-ethylene) block copolymer, (propylene)-(propylene-ethylene-1-butene) block copolymer, (propylene)-(propylene-ethylene-1-hexene) block copolymer, (propylene)-(propylene-1-butene) block copolymer, (propylene)-(propylene-1-hexene) block copolymer, (propylene-ethylene)-(propylene-ethylene-1-butene) block copolymer, (propylene-ethylene)-(propylene-ethylene-1-hexene) block copolymer, (propylene-ethylene)-(propylene-1-butene) block copolymer, (propylene-ethylene)-(propylene-1-hexene) block copolymer, (propylene-1-butene)-(propylene-ethylene) block copolymer, (propylene-1-butene)-(propylene-ethylene-1-butene) block copolymer, (propylene-1-butene)-(propylene-ethylene-1-hexene) block copolymer, (propylene-1-butene)-(propylene-1-butene) block copolymer, (propylene-1-butene)-(propylene-1-hexene) block copolymer and the like.

When propylene resins are used as the polyolefin, preferably used are crystalline propylene homopolymers, and polypropylene block copolymers composed of a propylene homopolymer component or a copolymer component composed mainly of propylene and a copolymer component composed of propylene and ethylene and/or α-olefin having 4 to 12 carbon atoms, more preferably used are polypropylene block copolymers composed of a propylene homopolymer component or a copolymer component composed mainly of propylene and a copolymer component composed of propylene and ethylene and/or α-olefin having 4 to 12 carbon atoms.

Regarding the crystallinity of the propylene resin, those having high crystallinity are preferable from the standpoint of rigidity and scratch resistance. As the propylene resin having high crystallinity, preferable are those having a fraction of 0.95 or more of propylene monomer units at the center of a chain formed by sequential meso linkage of five propylene monomer units, in terms of pentad unit in a propylene resin molecule obtained according to a method published by A. Zambelli et al. (Macromolecules 6, 925, 1973) used as an indication of crystallinity (the fraction being called pentad fraction, represented by [mmmm]).

Regarding production of the propylene resin, suitable are propylene resins produced by using, for example, a Ziegler type catalyst, a Ziegler Natta type catalyst, a catalyst system composed of a compound of a transition metal of the group IV in the periodic table having a cyclopentadienyl ring and an alkylaluminoxane, a catalyst system composed of a compound of a transition metal of the group IV in the periodic table having a cyclopentadienyl ring, a compound which reacts with the transition metal compound to form an ionic complex and an organoaluminum compound, or the like, as the polymerization catalyst.

Examples of the propylene resin production method include a slurry polymerization method with a hydrocarbon solvent, a solution polymerization method, a liquid phase polymerization method with no solvent, a gas phase polymerization method, a liquid phase-gas phase polymerization method for performing them continuously, and the like. These polymerization methods may be batch-wise or continuous. These may be methods for producing a propylene resin in one-stage, or methods for producing a propylene resin in two or more multi-stages In particular, as the method for producing the polypropylene block copolymer composed of a propylene homopolymer component or a copolymer component composed mainly of propylene and a copolymer component composed of propylene and ethylene and/or α-olefin having 4 to 12 carbon atoms, mentioned are production methods having at least two or more multi-stages including a stage for producing the propylene homopolymer component or copolymer component composed mainly of propylene and a stage for producing the copolymer component composed of propylene and ethylene and/or α-olefin having 4 to 12 carbon atoms.

(Phosphite (I))

The polyolefin composition used for production of a rotation molded body of the present invention contains a phosphite of the following formula (I) (hereinafter, referred to as phosphite (I) in some cases).

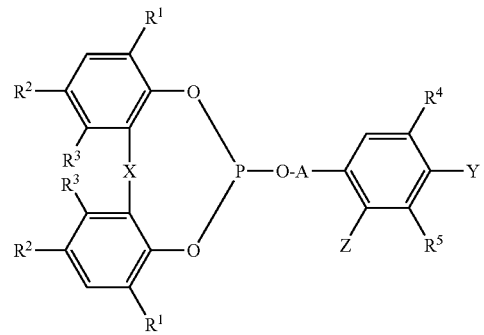

In the phosphite of the formula (I), $R^1$, $R^2$, $R^4$ and $R^5$ represent each independently a hydrogen atom, alkyl group having 1 to 8 carbon atoms, cycloalkyl group having 5 to 8 carbon atoms, alkylcycloalkyl group having 6 to 12 carbon atoms, aralkyll group having 7 to 12 carbon atoms or phenyl group.

Here, examples of the alkyl group having 1 to 8 carbon atoms include a methyl group, ethyl group, n-propyl group, i-propyl group, n-butyl group, i-butyl group, sec-butyl group, t-butyl group, t-pentyl group, i-octyl group, t-octyl group, 2-ethylhexyl group and the like.

Examples of the cycloalkyl group having 5 to 8 carbon atoms include a cyclopentyl group, cyclohexyl group, cycloheptyl group, cyclooctyl group and the like.

Examples of the alkylcycloalkyl group having 6 to 12 carbon atoms include a 1-methylcyclopentyl group, 1-methylcyclohexyl group, 1-methyl-4-i-propylcyclohexyl group and the like.

Examples of the aralkyll group having 7 to 12 carbon atoms include a benzyl group, α-methylbenzyl group, α,α-dimethylbenzyl group and the like.

In the (I), $R^1$, $R^2$ and $R^4$ represent preferably an alkyl group having 1 to 8 carbon atoms, cycloalkyl group having 5 to 8 carbon atoms or alkylcycloalkyl group having 6 to 12 carbon atoms. Particularly, $R^1$ and $R^4$ represent preferably a t-alkyl group such as a t-butyl group, t-pentyl group, t-octyl group and the like, a cyclohexyl group or 1-methylcyclohexyl group.

In the formula (I), $R^2$ represents preferably an alkyl group having 1 to 15 carbon atoms such as a methyl group, ethyl group, n-propyl group, i-propyl group, n-butyl group, i-butyl group, sec-butyl group, t-butyl group, t-pentyl group and the like, more preferably a methyl group, t-butyl group or t-pentyl group.

In the formula (I), $R^5$ represents preferably a hydrogen atom, alkyl group having 1 to 8 carbon atoms or cycloalkyl group having 5 to 8 carbon atoms, more preferably a hydrogen atom or alkyl group having 1 to 5 carbon atoms such as a methyl group, ethyl group, n-propyl group, i-propyl group, n-butyl group, i-butyl group, sec-butyl group, t-butyl group, t-pentyl group and the like.

In the formula (I), $R^3$ represents a hydrogen atom or alkyl group having 1 to 8 carbon atoms, and examples of the alkyl group having 1 to 8 carbon atoms include the same alkyl group as described above. It represents preferably a hydrogen atom or alkyl group having 1 to 15 carbon atoms, more preferably a hydrogen atom or methyl group.

In the formula (I), X represents a single bond, sulfur atom or methylene group. The methylene group may optionally be substituted with an alkyl group having 1 to 8 carbon atoms or cycloalkyl group having 5 to 8 carbon atoms. Here, as the alkyl group having 1 to 8 carbon atoms and cycloalkyl group having 5 to 8 carbon atoms optionally substituted on the methylene group, the same alkyl groups and cycloalkyl groups as described above are exemplified, respectively. X represents preferably a single bond, methylene group, or methylene group substituted with a methyl group, ethyl group, n-propyl group, i-propyl group, n-butyl group, i-butyl group, t-butyl group or the like, more preferably a single bond.

In the formula (I), A represents an alkylene group having 2 to 8 carbon atoms, or *—$COR^7$— group. $R^7$ represents a single bond or alkylene group having 1 to 8 carbon atoms.

Here, examples of the alkylene group having 1 to 8 carbon atoms include a methylene group, ethylene group, propylene group, butylene group, pentamethylene group, hexamethylene group, octamethylene group, 2,2-dimethyl-1,3-propylene group and the like, preferably a propylene group. * in the *—$COR^7$— group means that the group is a connecting bond at the oxygen side. That is, it means that a carbonyl group of the *—$COR^7$— group is linked to an oxygen atom of a phosphite group. The alkylene group having 1 to 8 carbon atoms represented by $R^7$ includes a methylene group, ethylene group, propylene group, butylene group, pentamethylene group, hexamethylene group, octamethylene group, 2,2-dimethyl-1,3-propylene group and the like. $R^7$ represents preferably a single bond or ethylene group.

In the formula (I), either one of Y and Z represents a hydroxyl group and other one represents a hydrogen atom or alkyl group having 1 to 8 carbon atoms. Here, examples of the alkyl group having 1 to 8 carbon atoms include the same alkyl groups as described above.

Examples of the phosphite (I) include 2,4,8,10-tetra-t-butyl-6-[3-(3-methyl-4-hydroxy-5-t-butylphenyl)propoxy]dibenzo[d,f][1,3,2]dioxaphosphepine, 6-[3-(3,5-di-t-butyl-4-hydroxyphenyl)propoxy]-2,4,8,10-tetra-t-butyldibenzo[d,f][1,3,2]dioxaphosphepine, 6-[3-(3,5-di-t-butyl-4-hydroxyphenyl)propoxy]-4,8-di-t-butyl-2,10-dimethyl-12H-dibenzo[d,g][1,3,2]dioxaphosphocin, 6-[3-(3,5-di-t-butyl-4-hydroxyphenyl)propionyloxy]-4,8-di-t-butyl-2,10-dimethyl-12H-dibenzo[d,g][1,3,2]dioxaphosphocin and the like.

Particularly, 2,4,8,10-tetra-t-butyl-6-[3-(3-methyl-4-hydroxy-5-t-butylphenyl)propoxy]dibenzo[d,f][1,3,2]dioxaphosphepine is preferable.

2,4,8,10-tetra-t-butyl-6-[3-(3-methyl-4-hydroxy-5-t-butylphenyl)propoxy]dibenzo[d,f][1,3,2]dioxaphosphepine is marketed commercially as Sumilizer GP (registered trademark, manufactured by Sumitomo Chemical Co., Ltd., hereinafter, referred to as phosphite (I-1)).

The content of the phosphite (I) in the polyolefin composition used in the present invention is in the range of usually 0.005 to 5 parts by weight, preferably 0.01 to 5 parts by weight, more preferably 0.01 to 3 parts by weight, further preferably 0.05 to 1 part by weight, still more preferably 0.15 to 1 part by weight with respect to 100 parts by weight the polyolefin composition.

The polyolefin composition used in the present invention may contain, if necessary, further other additives, for example, phenol antioxidants, sulfur-based antioxidants, phosphorus-based antioxidants other than the phosphite (I), ultraviolet absorbers, photostabilizers, peroxide scavengers, polyamide stabilizers, hydroxylamines, lubricant, plasticizers, flame retardants, nucleating agents, metal deactivators, antistatic agents, pigments, anti-blocking agents, surfactants, processing aids, foaming agents, emulsifiers, gloss agents, neutralizing agents such as calcium stearate, hydrotalcite and the like, further, coloration improving agents such as 9,10-dihydro-9-oxa-10-phosphenanethrene-10-oxide and the like, and auxiliary stabilizers such as benzofurans, indolines and the like described in U.S. Pat. Nos. 4,325,853, 4,338,244, 5,175,312, 5,216,053, 5,252,643, 4,316,611, DE-A-4,316,622, 4,316,876, EP-A-589,839, 591,102 and the like, etc. These additives may be blended, of course, simultaneously with the phosphite (I), or in a stage other than the stage for the phosphite (I).

Here, examples of the phenol antioxidant include the following compounds.

(1) Examples of phenol antioxidant 2,6-di-t-butyl-4-methylphenol, 2,4,6-tri-t-butylphenol, 2,6-di-t-butylphenol, 2-t-butyl-4,6-dimethylphenol, 2,6-di-t-butyl-4-ethylphenol, 2,6-di-t-butyl-4-n-butylphenol, 2,6-di-t-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-t-butyl-4-methoxymethylphenol, 2,6-di-nonyl-4-methylphenol, 2,4-dimethyl-6-(1'-methylundecyl-1'-yl)phenol, 2,4-dimethyl-6-(1'-methylheptadecyl-1'-yl)phenol, 2,4-dimethyl-6-(1'-methyltri-decyl-1'-yl)phenol and mixtures thereof, and the like.

(2) Examples of alkylthiomethylphenol 2,4-dioctylthiomethyl-6-t-butylphenol, 2,4-dioctylthiomethyl-6-methylphenol, 2,4-dioctylthiomethyl-6-ethylphenol, 2,6-didodecylthiomethyl-4-nonylphenol and mixtures thereof, and the like.

(3) Examples of hydroquinone and alkylated hydroquinone 2,6-di-t-butyl-4-methoxyphenol, 2,5-di-t-butylhydroquinone, 2,5-di-t-amylhydroquinone, 2,6-diphenyl-4-octadecyloxyphenol, 2,6-di-t-butylhydroquinone, 2,5-di-t-butyl-4-hydroxyanisole, 3,5-di-t-butyl-4-hydroxyphenyl stearate, bis(3,5-di-t-butyl-4-hydroxyphenyl) adipate and mixtures thereof, and the like.

(4) Examples of tocopherol

α-tocopherol, β-tocopherol, γ-tocopherol, δ-tocopherol and mixtures thereof, and the like.

(5) Examples of hydroxylated thiodiphenyl ether 2,2'-thiobis(6-t-butylphenol), 2,2'-thiobis(4-methyl-6-t-butylphenol), 2,2'-thiobis(4-octylphenol), 4,4'-thiobis(3-methyl-6-t-butylphenol), 4,4'-thiobis(2-methyl-6-t-butylphenol), 4,4'-thiobis(3,6-di-t-amylphenol), 4,4'-(2,6-dimethyl-4-hydroxyphenyl)disulfide and the like.

(6) Examples of alkylidenebisphenol and derivatives thereof 2,2'-methylenebis(4-methyl-6-t-butylphenol), 2,2'-methylenebis(4-ethyl-6-t-butylphenol), 2,2'-methylenebis[4-methyl-6-(α-methylcyclohexyl)phenol)], 2,2'-methylenebis(4-methyl-6-cyclohexylphenol), 2,2'-methylenebis(4-methyl-6-nonylphenol), 2,2'-methylenebis(4,6-di-t-butylphenol), 2,2'-ethylidenebis(4,6-di-t-butylphenol), 2,2'-ethylidenebis(4-isobutyl-6-t-butylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 2,6-bis(3-t-butyl-5-methyl-2-hydroxybenzyl)-4-methylphenol, 1,1,3-tris(5-t-butyl-4-hydroxy-2-methylphenyl)butane, 1,1-bis(5-t-butyl-4-hydroxy-2-methylphenyl)-3-n-dodecylmercaptobutane, ethylene glycol bis[3,3-bis-3'-t-butyl-4'-hydroxyphenyl)butyrate], bis(3-t-butyl-4-hydroxy-5-methylphenyl)dicyclopentadiene, bis[2-(3'-t-butyl-2'-hydroxy-5'-methylbenzyl)-6-t-butyl-4-methylphenyl]terephthalate, 1,1-bis(3,5-dimethyl-2-hydroxyphenyl)butane, 2,2-bis(3,5-di-t-butyl-4-hydroxyphenyl)propane, 2,2-bis(5-t-butyl-4-hydroxy-2-methylphenyl)-4-n-dodecylmercaptobutane, 1,1,5,5-tetra-(5-t-butyl-4-hydroxy-2-methylphenyl)pentane, 2-t-butyl-6-(3'-t-butyl-5'-methyl-2'-hydroxybenzyl)-4-methyl-phenylacrylate, 2,4-di-t-pentyl-6-[1-(2-hydroxy-3,5-di-t-pentylphenyl)ethyl]phenyl acrylate and mixtures thereof, and the like.

(7) Examples of O-, N- and S-benzyl derivatives
3,5,3',5'-tetra-t-butyl-4,4'-dihydroxydibenzyl ether, octadecyl-4-hydroxy-3,5-dimethylbenzyl mercaptoacetate, tris(3,5-di-t-butyl-4-hydroxybenzyl)amine, bis(4-t-butyl-3-hydroxy-2,6-dimethylbenzyl)dithioterephthalate, bis(3,5-di-t-butyl-4-hydroxybenzyl)sulfide, isooctyl-3,5-di-t-butyl-4-hydroxybenzyl mercaptoacetate and mixtures thereof, and the like.

(8) Examples of hydroxybenzylated malonate derivatives
dioctadecyl-2,2-bis(3,5 di-t-butyl-2-hydroxybenzyl)malonate, dioctadecyl-2-(3-t-butyl-4-hydroxy-5-methylbenzyl)malonate, didodecylmercaptoethyl-2,2-bis(3,5-di-t-butyl-4-hydroxybenzyl)malonate, bis[4-(1,1,3,3-tetramethylbutyl)phenyl]-2,2-bis(3,5-di-t-butyl-4-hydroxybenzyl)malonate and mixtures thereof, and the like.

(9) Examples of aromatic hydroxybenzyl derivatives
1,3,5-trimethyl-2,4,6-tris(3,5-di-t-butyl-4-hydroxybenzyl)benzene, 1,4-bis(3,5-di-t-butyl-4-hydroxybenzyl)-2,3,5,6-tetramethyl benzene, 2,4,6-tris(3,5-t-butyl-4-hydroxybenzyl)phenol and mixtures thereof, and the like.

(10) Examples of triazine derivatives
2,4-bis(n-octylthio)-6-(4-hydroxy-3,5-di-t-butylanilino)-1,3,5-triazine, 2-n-octylthio-4,6-bis(4-hydroxy-3,5-di-t-butylanilino)-1,3,5-triazine, 2-n-octylthio-4,6-bis(4-hydroxy-3,5-di-t-butylphenoxy)-1,3,5-triazine, 2,4,6-tris(3,5-di-t-butyl-4-phenoxy)-1,3,5-triazine, tris(4-t-butyl-3-hydroxy-2,6-dimethylbenzyl)isocyanurate, tris(3,5-di-t-butyl-4-hydroxybenzyl)isocyanurate, 2,4,6-tris(3,5-di-t-butyl-4-hydroxyphenylethyl)-1,3,5-triazine, 2,4,6-tris(3,5-di-t-butyl-4-hydroxyphenylpropyl)-1,3,5-triazine, tris(3,5-dicyclohexyl-4-hydroxybenzyl)isocyanurate, tris[2-(3',5'-di-t-butyl-4'-hydroxycinnamoyloxy)ethyl]isocyanurate and mixtures thereof, and the like.

(11) Examples of benzyl phosphonate derivatives
dimethyl-3,5-di-t-butyl-4-hydroxybenzyl phosphonate, diethyl-3,5-di-t-butyl-4-hydroxybenzyl phosphonate, dioctadecyl-3,5-di-t-butyl-4-hydroxybenzyl phosphonate, dioctadecyl-5-t-butyl-4-hydroxy-3-methylbenzyl phosphonate, calcium salts of 3,5-di-t-butyl-4-hydroxybenzylphosphonic monoester, and mixtures thereof, and the like.

(12) Examples of acylaminophenol derivatives
4-hydroxylauric anilide, 4-hydroxystearic anilide, octyl-N-(3,5-di-t-butyl-4-hydroxyphenyl)carbanate and mixtures thereof, and the like.

(13) Examples of ester of β-(3,5-di-t-butyl-4-hydroxyphenyl) propionic acid and monohydric or polyhydric alcohol described below
methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof, and the like.

(14) Examples of ester of β-(5-t-butyl-4-hydroxy-3-methylphenyl)propionic acid and monohydric or polyhydric alcohol described below
methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, tri-ethylene glycol, pentaerythritol, tris(hydroxyethyl)isocyanurate, N,N'-bis(hydroxyethyl)oxamide, 3-thiaundecanol, 3-thiapentadecanol, trimethylhexanediol, tri-methylolpropane, 4-hydroxymethyl-1-phospha-2,6,7-trioxabicyclo[2,2,2]octane and mixtures thereof, and the like.

(15) Examples of ester of p-(3,5-dicyclohexyl-4-hydroxyphenyl)propionic acid and monohydric or polyhydric alcohol described below
methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof, and the like.

(16) Examples of ester of 3,5-di-t-butyl-4-hydroxyphenylacetic acid and monohydric or polyhydric alcohol described below
methanol, ethanol, octanol, octadecanol, ethylene glycol, 1,3-propanediol, 1,4-butanediol, 1,6-hexanediol, 1,9-nonanediol, neopentyl glycol, diethylene glycol, thioethylene glycol, spiro glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane and mixtures thereof, and the like.

(17) Examples of amide of p-(3,5-di-t-butyl-4-hydroxyphenyl)propionic acid
N,N'-bis[3-(3',5'-di-t-butyl-4'-hydroxyphenyl)propionyl]hydrazine, N,N'-bis[3-(3',5'-di-t-butyl-4'-hydroxyphenyl)propionyl]hexamethylenediamine, N,N'-bis[3-(3',5'-di-t-butyl-4'-hydroxyphenyl)propionyl]trimethylenediamine and mixtures thereof, and the like.

The phenol antioxidant includes preferably pentaerythritol tetrakis[3-(3,5-di-tert-butyl-4-hydroxyphenyl)propionate, octadecyl-3-(3,5-di-tert-butyl-4-hydroxyphenyl)propionate and 3,9-bis[2-{3-(3-t-butyl-4-hydroxy-5-methylphenyl)propionyloxy}-1,1-dimethylethyl]-2,4,8,10-tetraoxaspiro[5.5]undecane, and particularly, pentaerythritol tetrakis[3-(3,5-di-tert-butyl-4-hydroxyphenyl)propionate and octadecyl-3-(3,5-di-tert-butyl-4-hydroxyphenyl)propionate are preferable, and pentaerythritol tetrakis[3-(3,5-di-tert-butyl-4-hydroxyphenyl)propionate is more preferable.

Here, the weight ratio of the phosphite (I) and phenol antioxidant (phosphite (I):phenol antioxidant) is preferably 5:1 to 1:10, more preferably 4:1 to 1:5, particularly preferably 3:1 to 1:3.

Examples of the sulfur-based antioxidant include the following compounds.
dilauryl 3,3'-thiodipropionate, tridecyl 3,3'-thiodipropionate, dimyristyl 3,3'-thiodipropionate, distearyl 3,3'-thiodipropionate, lauryl stearyl 3,3'-thiodipropionate, neopentanetetrayltetrakis(3-lauryl thiopropionate) and the like.

As the phosphorus-based antioxidant other than the phosphite (I), for example, the following compounds are mentioned.

triphenylphosphite, tris(nonylphenyl)phosphite, tris(2,4-di-t-butylphenyl)phosphite, trilaurylphosphite, trioctadecylphosphite, distearyl pentaerythritol diphosphite, diisodecylpentaerythritol diphosphite, bis(2,4-di-t-butylphenyl) pentaerythritol diphosphite, bis(2,4-di-t-butyl-6-methylphenyl)pentaerythritol diphosphite, bis(2,6-di-t-butyl-4-methylphenyl)pentaerythritol diphosphite, bis(2,4,6-tri-t-butylphenyl)pentaerythritol diphosphite, tristearyl sorbitol tri-phosphite, tetrakis(2,4-di-t-butylphenyl)-4,4'-diphenylene diphosphonite, 2,2'-methylenebis(4,6-di-t-butylphenyl) 2-ethylhexyl phosphite, 2,2'-ethylidenebis(4,6-di-t-butylphenyl)fluoro phosphite, bis(2,4-di-t-butyl-6-methylphenyl)ethyl phosphite, bis(2,4-di-t-butyl-6-methylphenyl)methyl phosphite, 2-(2,4,6-tri-t-butylphenyl)-5-ethyl-5-butyl-1,3,2-oxaphosphorinane, 2,2',2''-nitrilo[triethyltris(3,3',5,5'-tetra-t-butyl-1,1'-biphenyl-2,2'-diyl) phosphite and mixtures thereof, and the like.

Particularly, tris(2,4-di-t-butylphenyl)phosphite (Irgafos 168: registered trademark, manufactured by Ciba Specialty Chemicals) is preferable.

Here, the weight ratio of the phosphite (I) and phosphorus-based antioxidant (phosphite (I):phosphorus-based antioxidant) is preferably 5:1 to 1:10, more preferably 4:1 to 1:5, particularly preferably 3:1 to 1:3.

Examples of the ultraviolet absorber include the following compounds.

(1) Examples of salicylate derivatives phenyl salicylate, 4-t-butylphenyl salicylate, 2,4-di-t-butylphenyl 3',5'-di-t-butyl-4'-hydroxybenzoate, 4-t-octylphenyl salicylate, bis(4-t-butylbenzoyl)resorcinol, benzoyl resorcinol, hexadecyl 3',5'-di-t-butyl-4'-hydroxybenzoate, octadecyl 3',5'-di-t-butyl-4'-hydroxybenzoate, 2-methyl-4,6-di-t-butylphenyl 3',5'-di-t-butyl-4-hydroxybenzoate and mixtures thereof, and the like.

(2) Examples of 2-hydroxy-benzophenone derivatives 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone and mixtures thereof, and the like.

(3) Examples of 2-(2'-hydroxyphenyl)benzotriazole 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl) benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis(α,α-dimethylbenzyl)phenyl]-2H-benzo triazole, 2-[(3'-t-butyl-2'-hydroxyphenyl)-5'-(2-octyloxycarbonylethyl)phenyl]-5-chlorobenzotriazole, 2-[3'-t-butyl-5'-[2-(2-ethylhexyloxy) carbonylethyl]-2'-hydroxyphenyl]-5-chlorobenzotriazole, 2-[3'-t-butyl-2'-hydroxy-5'-(2-methoxycarbonylethyl)phenyl]-5-chlorobenzotriazole, 2-[3'-t-butyl-2'-hydroxy-5'-(2-methoxycarbonylethyl)phenyl]benzotriazole, 2-[3'-t-butyl-2'-hydroxy-5-(2-octyloxycarbonylethyl)phenyl] benzotriazole, 2-[3'-t-butyl-2'-hydroxy-5'-[2-(2-ethylhexyloxy)carbonylethyl]phenyl]benzotriazole, 2-[2-hydroxy-3-(3,4,5,6-tetrahydrophthalimidemethyl)-5-methylphenyl]benzotriazole, 2-(3,5-di-t-butyl-2-hydroxyphenyl)-5-chlorobenzotriazole; mixture of 2-(3'-dodecyl-2'-hydroxy-5'-methylphenyl)benzotriazole and 2-[3'-t-butyl-2'-hydroxy-5'-(2-isooctyloxycarbonylethyl) phenyl]benzotriazole; 2,2'-methylenebis[6-(2H-benzotriazole-2-yl)-4-(1,1,3,3-tetramethylbutyl)phenol, 2,2'-methylenebis[4-t-butyl-6-(2H-benzotriazole-2-yl)phenol];

condensate of poly(3 to 11)(ethylene glycol) and 2-[3'-t-butyl-2'-hydroxy-5'-(2-methoxycarbonylethyl)phenyl]benzotriazole; condensate of poly(3 to 11) (ethylene glycol) and methyl 3-[3-(2H-benzotriazol-2-yl)-5-t-butyl-4-hydroxyphenyl]propionate; 2-ethylhexyl 3-[3-t-butyl-5-(5-chloro-2H-benzotriazol-2-yl)-4-hydroxyphenyl]propionate, octyl 3-[3-t-butyl-5-(5-chloro-2H-benzotriazol-2-yl)-4-hydroxyphenyl]propionate, methyl 3-[3-t-butyl-5-(5-chloro-2H-benzotriazol-2-yl)-4-hydroxyphenyl]propionate, 3-[3-t-butyl-5-(5-chloro-2H-benzotriazol-2-yl)-4-hydroxypheyl] propionic acid and mixtures thereof, and the like.

Examples of the photostabilizer include the following compounds.

(1) Examples of hindered amine photostabilizer bis(2,2,6,6-tetramethyl-4-piperidyl)sebacate, bis((2,2,6,6-tetramethyl-4-piperidyl)succinate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl) 2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(1,2,2,6,6-pentamethyl-4-piperidyldecane dioate, 2,2,6,6-tetramethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl) propionamide, tetrakis(2,2,6,6-tetramethyl-4-piperidyl) 1,2,3,4-butane tetracarboxylate, tetrakis(1,2,2,6,6-pentamethyl-4-piperidyl) 1,2,3,4-butane tetracarboxylate, mixed ester of 1,2,3,4-butanetetracarboxylic acid with 1,2,2,6,6-pentamethyl-4-piperidinol and 1-tridecanol, mixed ester of 1,2,3,4-butanetetracarboxylic acid with 2,2, 6,6-tetramethyl-4-piperidinol and 1-tridecanol, mixed ester of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane, mixed ester of 1,2,3,4-butanetetracarboxylic acid with 2,2,6,6-tetramethyl-4-piperidinol and 3,9-bis(2-hydroxy-1,1-dimethylethyl)-2,4, 8,10-tetraoxaspiro[5.5]undecane, polycondensate of dimethyl succinate with 1-(2-hydroxy-ethyl)-4-hydroxy-2,2,6,6-tetra-methylpiperidine; poly[(6-morpholino-1,3,5-triazine-2,4-diyl)((2,2,6,6-tetramethyl-4-piperidyl)imino) hexamethylene((2,2,6,6-tetramethyl-4-piperidyl)imino)], poly[(6-(1,1,3,3-tetramethylbutyl)imino-1,3,5-triazine-2,4-diyl((2,2,6,6-tetramethyl-4-piperidyl)imino)hexamethylene ((2,2,6,6-tetramethyl-4-piperidyl)imino)], polycondensate of N,N'-bis(2,2,6,6-tetramethyl-4-piperidyl)hexamethylenediamine with 1,2-dibromoethane; N,N',4,7-tetrakis[4,6-bis (N-butyl-N-(2,2,6,6-tetramethyl-4-piperidyl)amino)-1,3,5-triazine-2-yl]-4,7-diazadecane-1,10-diamine, N,N',4-tris[4, 6-bis(N-butyl-N-(2,2,6,6-tetramethyl-4-piperidyl)amino)-1, 3,5-triazine-2-yl]-4,7-diazadecane-1,10-diamine, N,N',4,7-tetrakis[4,6-bis(N-butyl-N-(1,2,2,6,6-pentamethyl-4-piperidyl)amino)-1,3,5-triazine-2-yl]-4,7-diazadecane-1,10-diamine, N,N',4-tris[4,6-bis(N-butyl-N-(1,2,2,6,6-pentamethyl-4-piperidyl)amino)-1,3,5-triazine-2-yl]-4,7-diazadecane-1,10-diamine and mixtures thereof, and the like.

(2) Examples of acrylate photostabilizer ethyl α-cyano-β,β-diphenyl acrylate, isooctyl α-cyano-β, β-diphenylacrylate, methyl α-carbomethoxy cinnamate, methyl α-cyano-β-methyl-p-methoxy cinnamate, butyl α-cyano-β-methyl-p-methoxy cinnamate, methyl α-carbomethoxy-p-methoxy cinnamate and N-(β-carbomethoxy-β-cyanovinyl)-2-methylindoline and mixtures thereof, and the like.

(3) Examples of nickel-based photostabilizer nickel complex of 2,2'-thiobis[4-(1,1,3,3-tetramethylbutyl)phenol]; nickeldibutyl dithiocarbamate, nickel salts of monoalkyl ester, nickel complex of ketoxime, and mixtures thereof, and the like.

(4) Examples of oxamide photostabilizer 4,4'-dioctyloxyoxanilide, 2,2'-diethoxyoxanilide, 2,2'-dioctyloxy-5,5'-di-t-butylanilide, 2,2'-didodecyl-oxy-5,5'-di-t-butylanilide, 2-ethoxy-2'-ethyloxanilide, N,N'-bis(3-dimethylaminopropyl)oxamide, 2-ethoxy-5-t-butyl-2'-ethoxyanilide, 2-ethoxy-5,4'-di-t-butyl-2'-ethyloxanilide and mixtures thereof, and the like.

(5) Examples of 2-(2-hydroxyphenyl)-1,3,5-triazine photostabilizer 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-[2,4-dihydroxyphenyl-4,6-bis(2,4-dimethylphenyl]-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-[2-hydroxy-4-dodecyloxyphenyl)-4,6-bis(2,4-dimethylphenyl]-1,3,5-triazine, 2-[2-hydroxy-4-(2-hydroxy-3-butyloxypropoxy)phenyl]-4,6-bis (2,4-dimethylphenyl)-1,3,5-triazine, 2-[2-hydroxy-4-(2-hydroxy-3-octyloxypropoxy)phenyl]-4,6-bis (2,4-dimethylphenyl)-1,3,5-triazine and mixtures thereof, and the like.

Examples of the metal deactivator include N,N'-diphenyl oxamide, N-salicylal-N'-salicyloylhydrazine, N,N'-bis(salicyloyl)hydrazine, N,N'-bis(3,5-di-t-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoylbisphenyl hydrazide, N,N'-bis(salicyloyl)oxalyl dihydrazide, N,N'-bis(salicyloyl)thiopropionyl dihydrazide and mixtures thereof, and the like.

Examples of the peroxide scavenger include esters of β-thiodipropionic acid; mercaptobenzoimidazole; zinc salt of 2-mercaptobenzoimidazole, zinc salt of dibutyldithiocarbamic acid; dioctadecyl disulfide, pentaerythritol tetrakis(β-dodecylmercapto) propionate and mixtures thereof, and the like. Examples of the polyamide stabilizer include copper or di-valent manganese salts of iodides or phosphorus compounds and mixtures thereof, and the like. Examples of hydroxylamine include N,N-dibenzylhydroxyamine, N,N-diethylhydroxyamine, N,N-dioctylhydroxyamine, N,N-dilaurylhydroxyamine, N,N-ditetradecylhydroxyamine, N,N-dihexadecylhydroxyamine, N,N-dioctadecylhydroxyamine, N-hexadecyl-N-octadecylhydroxyamine, N-heptadecyl-N-octadecylhydroxyamine and mixtures thereof, and the like. Examples of the neutralizing agent include calcium stearate, zinc stearate, magnesium stearate, hydrotalcite (basic magnesium.aluminum.hydroxy.carbonate.hydrate), melamine, amine, polyamide, polyurethane and mixtures thereof, and the like. Examples of the lubricant include aliphatic hydrocarbons such as paraffin, wax and the like, higher aliphatic acids having 8 to 22 carbon atoms, metal (Al, Ca, Mg, Zn) salts of higher aliphatic acids having 8 to 22 carbon atoms, aliphatic alcohols having 8 to 22 carbon atoms; polyglycols; esters of higher fatty acids having 4 to 22 carbon atoms and aliphatic monohydric alcohols having 4 to 18 carbon atoms; higher aliphatic amides having 8 to 22 carbon atoms; silicone oils, rosin derivatives, and the like.

Examples of the nucleating agent include sodium 2,2'-methylenebis(4,6-di-t-butylphenyl)phosphate, [phosphoric acid-2,2'-methylenebis(4,6-di-t-butylphenyl)]dihydroxyaluminum, bis[phosphoric acid-2,2'-methylenebis(4,6-di-t-butylphenyl)]hydroxyaluminum, tris[phosphoric acid-2,2'-methylenebis(4,6-di-t-butylphenyl)]aluminum, sodium bis(4-t-butylphenyl)phosphate, metal salts of benzoic acid such as sodium benzoate and the like; aluminum p-t-butylbenzoate, 1,3:2,4-bis(O-benzylidene)sorbitol, 1,3:2,4-bis(0-methylbenzylidene)sorbitol, 1,3:2,4-bis(0-ethylbenzylidene)sorbitol, 1,3-0-3,4-dimethylbenzylidene-2,4-0-benzylidenesorbitol, 1,3-0-benzylidene-2,4-0-3,4-dimethylbenzylidenesorbitol, 1,3:2,4-bis(0-3,4-dimethylbenzylidene)sorbitol, 1,3-0-p-chlorobenzylidene-2,4-0-3,4-dimethylbenzylidenesorbitol, 1,3-0-3,4-dimethylbenzylidene-2,4-0-p-chlorobenzylidenesorbitol, 1,3:2,4-bis(0-p-chlorobenzylidene)sorbitol and mixtures thereof, and the like.

Of these additives, preferably used are phenol antioxidants, ultraviolet absorbers, hindered amine photostabilizers, peroxide scavengers, neutralizing agents and fillers. As the particularly preferable phenol antioxidants, the following compounds are mentioned. These compounds can be used in combination of two or more.

2,6-di-t-butyl-4-methylphenol, 2,4,6-tri-t-butylphenol, 2,4-dioctylthiomethyl-6-methylphenol, 2,2'-thiobis(6-t-butylphenol), 4,4'-thiobis(3-methyl-6-t-butylphenol), 2,2'-methylenebis(4-methyl-6-t-butylphenol), 2,2'-methylenebis(4-ethyl-6-t-butylphenol), 2,2'-methylenebis[4-methyl-6-(α-methylcyclohexyl)phenol)], 2,2'-methylenebis(4-methyl-6-cyclohexylphenol), 2,2'-methylenebis(4,6-di-t-butylphenol), 2,2'-ethylidenebis(4,6-di-t-butylphenol), 4,4'-methylenebis(6-t-butyl-2-methylphenol), 4,4'-methylenebis(2,6-di-t-butylphenol), 4,4'-butylidenebis(3-methyl-6-t-butylphenol), 1,1-bis(4-hydroxyphenyl)cyclohexane, 1,1-bis(5-t-butyl-4-hydroxy-2-methylphenyl)butane, 1,1,3-tris(5-t-butyl-4-hydroxy-2-methylphenyl)butane, ethylene glycol bis[3,3-bis-3'-t-butyl-4'-hydroxyphenyl)butyrate], 2-t-butyl-6-(3'-t-butyl-5'-methyl-2'-hydroxybenzyl)-4-methyl-phenyl acrylate, 2,4-di-t-pentyl-6-[1-(2-hydroxy-3,5-di-t-pentylphenyl)ethyl]phenyl acrylate, 2,4,6-tris(3,5-di-t-butyl-4-phenoxy)-1,3,5-triazine, tris(4-t-butyl-3-hydroxy-2,6-dimethylbenzyl)isocyanurate, bis(3,5-di-t-butyl-4-hydroxybenzyl)isocyanurate, tris[2-(3',5'-di-t-butyl-4'-hydroxycinnamoyloxy)ethyl]isocyanurate, diethyl-3,5-di-t-butyl-4-hydroxybenzyl phosphonate, di-n-octadecyl-3,5-di-t-butyl-4-hydroxybenzyl phosphonate; calcium salts of 3,5-di-t-butyl-4-hydroxybenzylphosphonic monoester; n-octadecyl 3-(3,5-di-t-butyl-4-hydroxyphenyl)propionate, neopentanetetrayl tetrakis(3,5-di-t-butyl-4-hydroxy cinnamate), thiodiethylenebis(3,5-di-t-butyl-4-hydroxy cinnamate), 1,3,5-tri-methyl-2,4,6-tris(3,5-di-t-butyl-4-hydroxybenzyl) benzene, 3,6-dioxaoctamethylenebis(3,5-di-t-butyl-4-hydroxy cinnamate), hexamethylenebis(3,5-di-t-butyl-4-hydroxy cinnamate), triethylene glycol bis(5-t-butyl-4-hydroxy-3-methyl cinnamate), 3,9-bis[2-(3-(3-t-butyl-4-hydroxy-5-methylphenyl)propionyloxy)-1,1-dimethylethyl]-2,4,8,10-tetraoxaspiro[5.5]undecane, N,N'-bis[3-(3',5'-di-t-butyl-4'-hydroxyphenyl)propionyl] hydrazine, N,N'-bis[3-(3',5'-di-t-butyl-4'-hydroxyphenyl)propionyl]hexamethylenediamine, and the like As the particularly preferable ultraviolet absorbers, the following compounds are mentioned. These compounds can be used in combination of two or more.

phenyl salicylate, 4-t-butylphenyl salicylate, 2,4-di-t-butylphenyl 3',5'-di-t-butyl-4'-hydroxybenzoate, 4-t-octylphenyl salicylate, 2,4-dihydroxybenzophenone, 2-hydroxy-4-methoxybenzophenone, 2-hydroxy-4-octoxybenzophenone, 2,2'-dihydroxy-4-methoxybenzophenone, bis(5-benzoyl-4-hydroxy-2-methoxyphenyl)methane, 2,2',4,4'-tetrahydroxybenzophenone, 2-(2-hydroxy-5-methylphenyl)benzotriazole, 2-(3',5'-di-t-butyl-2'-hydroxyphenyl)benzotriazole, 2-(5'-t-butyl-2'-hydroxyphenyl)benzotriazole, 2-(2'-hydroxy-5'-t-octylphenyl)benzotriazole, 2-(3-t-butyl-2-hydroxy-5-methylphenyl)-5-chlorobenzotriazole, 2-(3'-s-butyl-2'-hydroxy-5'-t-butylphenyl)benzotriazole, 2-(2'-hydroxy-4'-octyloxyphenyl)benzotriazole, 2-(3',5'-di-t-amyl-2'-hydroxyphenyl)benzotriazole, 2-[2'-hydroxy-3',5'-bis($\alpha,\alpha$-dimethylbenzyl)phenyl]-2H-benzotriazole and the like As the particularly preferable photostabilizers, the following compounds are mentioned. These compounds can be used in combination of two or more.

bis(2,2,6,6-tetramethyl-4-piperidyl)sebacate, bis(1,2,2,6,6-pentamethyl-4-piperidyl)sebacate, bis(N-octoxy-2,2,6,6-tetramethyl-4-piperidyl)sebacate, bis(N-benzyloxy-2,2,6,6-tetramethyl-4-piperidyl)sebacate, bis(N-cyclohexyloxy-2,2,6,6-tetramethyl-4-piperidyl)sebacate, bis(1,2,2,6,6-pentamethyl-4-piperidyl) 2-(3,5-di-t-butyl-4-hydroxybenzyl)-2-butyl malonate, bis(1-acroyl-2,2,6,6-tetramethyl-4-piperidyl) 2,2-bis(3,5-di-t-butyl-4-hydroxybenzyl)-2-butyl malonate, bis(2,2,6,6-tetramethyl-4-piperidyl)succinate, 2,2,6,6-tetra-ethyl-4-piperidyl methacrylate, 4-[3-(3,5-di-t-butyl-4-hydroxyphenyl)propionyloxy]-1-[2-(3-(3,5-di-t-butyl-4-hydroxyphenyl)propionyloxy)ethyl]-2,2,6,6-tetramethylpiperidine, 2-methyl-2-(2,2,6,6-tetramethyl-4-piperidyl)amino-N-(2,2,6,6-tetramethyl-4-piperidyl)propionamide, tetrakis(2,2,6,6-tetramethyl-4-piperidyl) 1,2,3,4-butane tetracarboxylate, tetrakis(1,2,6,6-pentamethyl-4-piperidyl) 1,2,3,4-butane tetracarboxylate; mixed ester of 1,2,3,4-butanetetracarboxylic acid with 1,2,2,6,6-pentamethyl-4-piperidinol and 1-tridecanol, mixed ester of 1,2,3,4-butanetetracarboxylic acid with 2,2,6,6-tetramethyl-4-piperidinol and 1-tridecanol, mixed ester of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane, mixed ester of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane, polycondensate of dimethyl succinate with 1-(2-hydroxyethyl)-4-hydroxy-2,2,6,6-tetramethylpiperidine; poly[(6-morpholino-1,3,5-triazine-2,4-diyl)((2,2,6,6-tetramethyl-4-piperidyl)imino)hexamethylene((2,2,6,6-tetramethyl-4-piperidyl)imino)], poly[(6-(1,1,3,3-tetramethylbutyl)-1,3,5-triazine-2,4-diyl) ((2,2,6,6-tetra-methyl-4-piperidyl)imino)hexamethylene((2,2,6,6-tetramethyl-4-piperidyl)imino)), and the like The total content of the above-described additives in the polyolefin composition used in the present invention is usually 10 parts by weight or less, preferably about 0.001 to 5 parts by weight with respect to 100 parts by weight the polyolefin composition.

The polyolefin composition used in the present invention may contain a filler. Examples of the filler include calcium carbonate, silicate, glass fiber, asbestos, talc, kaolin, mica, barium sulfate, carbon black, carbon fiber, zeolite and mixtures thereof and the like.

The total content of the above-described fillers in the polyolefin composition used in the present invention is usually 40 parts by weight or less, preferably 20 parts by weight or less with respect to 100 parts by weight the polyolefin composition.

In blending the phosphite (I) or other additives to be used if necessary into a polyolefin, known all methods for obtaining a uniform mixture can be used. When the polyolefin is solid for example, the phosphite (I) or further other additives can be blended directly into the solid polyolefin, or the phosphite compound or further other additives can be blended in the form of master batch into the solid polyolefin.

When the polyolefin is liquid, the phosphite (I) or further other additives may be blended in the form of solution or dispersion into a polymer solution during polymerization or directly after polymerization, alternatively, the phosphite (I) or further other additives may be dissolved or suspended in the liquid polyolefin obtained as the product.

The polyolefin composition used in the present invention is obtained by mixing a polyolefin and a phosphite (I), and if necessary, additives and fillers, by a mixer such as a Henschel mixer, super mixer, high speed mixer and the like.

The polyolefin composition used in the present invention can be heated at the melting temperature of a substance of the lowest melting point among the polyolefin, phosphite (I), additives and fillers or at a temperature higher or lower than the melting point by about 5° C. or less and extrusion-molded to obtain a pellet of the composition. If the polyolefin, phosphite (I), additives and fillers are stirred and granulated at the above-described temperature, granules of the composition can be obtained.

The composition used in the present invention preferably has a form of powder to granule.

The rotation molded body of the present invention is obtained by rotation molding of the above-described polyolefin composition. Specifically, there is exemplified a method in which the above-described composition is placed in a molding die such as a metal mold and the like, the molding die is heated and rotated, and after the melted composition flows to form a uniform layer, the molding die is cooled, or other method.

There is also exemplified a method in which a polyolefin composition composed of a polyolefin, phosphite (I) and additives is mixed with fillers, then, the mixture is placed in a molding die, the molding die is heated and rotated, and after the melted composition flows to form a uniform layer, the molding die is cooled, or other method.

The above-described rotation may be uniaxial rotation or biaxial rotation.

It may also be permissible that the above-described composition is used in excess amount, a rotation molded body having desired thickness is obtained, then, surplus amount of the above-described composition is removed.

The heating temperature in rotation molding is usually about 200° C. to 400° C.

Even if the composition used in the present invention is exposed under high temperature for a long period of time, yellowing of the resulting rotation molded body can be suppressed. Specifically, the molding temperature is preferably 200° C. to 350° C., more preferably 220° C. to 300° C., particularly preferably 240° C. to 260° C. When the temperature is too low, the molding time tends to be extended, and the temperature is too high, there is a tendency that yellowing cannot be suppressed. When heated at 250° C., the heating time is preferably 5 minutes to 30 minutes, more preferably 10 minutes to 20 minutes, still more preferably 10 minutes to 15 minutes. Within this heating time range, a molded body can be formed and yellowing of the resultant molded body tend to be slight.

The cooling time is preferably 10 minutes or more and 120 minutes or less, more preferably 20 minutes or more and 60 minutes or less. Within this cooling time range, a molded body can be removed easily from a metal mold, and yellowing of the resultant molded body tends to be slight.

The resulting rotation molded body has its maximum diameter of preferably 0.5 m or more, more preferably 1.0 m or more.

The resultant rotation molded body has a YI value in an anti-yellowing test described later of preferably 4 or less, more preferably 3 or less, further preferably 2 or less, still more preferably 1.5 or less, particularly preferably 1 or less.

As the anti-yellowing test method in the present invention, the following method is mentioned. As a method for confirmation with pellets having a maximum diameter of 10 mm, there is a method in which pellets are filled in a vial bottle up to a height of 3 cm, heated at given temperature for given time, then, the yellowness index of the bottom surface of the vial bottle is measured according to JIS K7105 using a color-difference meter CM-3500d manufactured by Minolta.

As a method for measurement using a rotation molded body, there is a method in which a sample piece of 4×6 cm is cut from the side surface of a rotation molded body obtained under given conditions, and the yellowness index of the surface of the product is measured according to JIS K7105 using a color-difference meter CM-3500d manufactured by Minolta.

The rotation molded body of the present invention is used as a molded article, vessel, tank or the like used in the industrial fields such as, for example, automobile, electricity, house building material, civil engineering, agriculture, horticulture, forestry, fishery and environmental applications and the like, and particularly, suitably used as a large scale molded article, vessel or tank.

According to the present invention, it becomes possible to provide a rotation molded body of which yellowing is suppressed even if exposed under high temperature for a long period of time.

EXAMPLES

The present invention will be described in detail below with examples and comparative examples.

Example 1

Production Example of Polyolefin Composition 100 parts by weight of a polypropylene powder (MFR: 2.0 g/10 min) was dry-blended with 0.3 parts by weight of a phosphite (I-1) (2,4,8,10-tetra-t-butyl-6-[3-(3-methyl-4-hydroxy-5-t-butylphenyl) propoxy]dibenzo[d,f][1,3,2]dioxaphosphepine, manufactured by Sumitomo Chemical Co., Ltd.), then, the mixture was extrusion-molded at 200° C. using a single screw extruder of 30 mm φ, to obtain a polyolefin composition in the form of pellet.

<Anti-Yellowing Test>

The pellets obtained in <Production example of polyolefin composition> were filled in a 20 ml vial bottle up to a height of 3 cm, and left in an oven of 200° C. for 24 hours. The YI value of the bottom surface of the vial bottle was measured by a method for testing the optical property of a plastic according to JIS K7105 using a color-difference meter CM-3500d manufactured by Minolta, to fin a YI value of −9.4. When the YI value is smaller, the degree of yellowing is smaller and the anti-yellowing property is higher.

Comparative Examples 1 to 3

The same procedure as in Example 1 was carried out excepting the no phosphite was used (Comparative Example 1), Irgafos 168 (registered trademark, manufactured by Ciba Specialty Chemicals) was used (Comparative Example 2), or a phenol antioxidant Irganox 1010 (registered trademark, manufactured by Ciba Specialty Chemicals) was used (Comparative Example 3) instead of the phosphite (I).

The results are shown in Table 1 together with the result of Example 1.

TABLE 1

| | polyolefin composition | | |
|---|---|---|---|
| | polyolefin (parts by weight) | phosphite others (parts by weight) | YI value |
| Example 1 | polypropylene (100) | Compound (I-1) (0.3) | −9.4 |
| Comparative Example 1 | polypropylene (100) | none | 4.7 |
| Comparative Example 2 | polypropylene (100) | Irgafos 168 (0.3) | 3.3 |
| Comparative Example 3 | polypropylene (100) | Irganox 1010 (0.3) | 14.5 |

Example 2

Production Example of Rotation Molded Body

Pellets were produced in the same manner as in <Production example of polyolefin composition> described in Example 1 excepting that the polypropylene was changed to a low density polyethylene (manufactured by Sumitomo Chemical Co., Ltd., MFR: 4.0 g/10 min), then, ground into a powder. 3 kg of a polyethylene powder obtained by the above-described grinding was subjected to rotation molding at 250° C. for 12 minutes using a rotation molding system GYRO SPACE manufactured by Konan Tokushusangyo Co., Ltd, and cooled for 30 minutes, then, a rotation molded body (molded body having a maximum diameter of 0.6 m) was removed from the metal mold.

<Anti-Yellowing Test>

A sample piece of 4 cm×6 cm×about 5 mm thickness was cut out from the side surface of the resultant rotation molded body, and the yellowness index of the surface of the product was measured according to JIS K7105 using a color-difference meter CM-3500d manufactured by Minolta.

Example 3

A rotation molded body was produced and evaluated in the same manner as in Example 1 excepting the amount of the phosphite (I-1) was changed to 0.2 parts by weight.

Examples 4 to 5

Rotation molded bodies were produced and evaluated in the same manner as in Example 3 excepting the amount of the phosphite (I-1) was changed to 0.2 parts by weight, and Irgafos 168 (registered trademark, manufactured by Ciba Specialty Chemicals) was used (Comparative Example 2) or a phenol antioxidant Irganox 1010 (registered trademark, manufactured by Ciba Specialty Chemicals) was additionally used.

Comparative Examples 4 to 7

Rotation molded bodies were produced and evaluated in the same manner as in Example 1 excepting that the phosphite (I-1) was changed to additives described in Table 2.

TABLE 2

|  | polyolefin composition | | |
|---|---|---|---|
|  | polyolefin (parts by weight) | phosphite others (parts by weight) | YI value |
| Example 2 | polyethylene (100) | compound (I-1) (0.3) | 1.3 |
| Example 3 | polyethylene (100) | compound (I-1) (0.2) | −0.6 |
| Example 4 | polyethylene (100) | compound (I-1)/Irgafos 168 (0.2/0.1) | −0.8 |
| Example 5 | polyethylene (100) | compound (I-1)/Irganox 1010 (0.2/0.1) | 0.7 |
| Comparative Example 4 | polyethylene (100) | Irgafos 168 (0.3) | 12.3 |
| Comparative Example 5 | polyethylene (100) | Irgafos 168 (0.2) | 4.1 |
| Comparative Example 6 | polyethylene (100) | Irgafos 168-Irganox 1010 (0.2/0.1) | 6.9 |
| Comparative Example 7 | polyethylene (100) | Irgafos 168-Irganox 1010 (0.13/0.07) | 5.1 |

INDUSTRIAL APPLICABILITY

The rotation molded body of the present invention is used as a molded article, vessel, tank or the like used in the industrial fields such as automobile, electricity, house building material, civil engineering, agriculture, horticulture, forestry, fishery and environmental applications and the like, and particularly, suitably used as a large scale molded article, vessel or tank, since even if the ration molded body is exposed under high temperature for a long period of time, yellowing coloration is suppressed, indicating an excellent antioxidizing performance.

The invention claimed is:

1. A process for producing a rotation molded body by rotation molding of a polyolefin composition comprising a polyolefin and a phosphite of the formula (I):

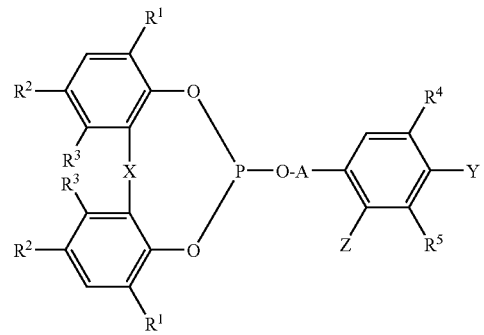

(I)

(in the formula (I), $R^1$, $R^2$, $R^4$ and $R^5$ represent each independently a hydrogen atom, alkyl group having 1 to 8 carbon atoms, cycloalkyl group having 5 to 8 carbon atoms, alkylcycloalkyl group having 6 to 12 carbon atoms, aralkyl group having 7 to 12 carbon atoms or phenyl group, $R^3$ represents a hydrogen atom or alkyl group having 1 to 8 carbon atoms, X represents a single bond, sulfur atom or —$CHR^6$— group ($R^6$ represents a hydrogen atom, alkyl group having 1 to 8 carbon atoms or cycloalkyl group having 5 to 8 carbon atoms), A represents an alkylene group having 1 to 8 carbon atoms or *—$COR^7$— group ($R^7$ represents a single bond or alkylene group having 1 to 8 carbon atoms, and * means that the group is a connecting bond at the oxygen side), and either one of Y and Z represents a hydroxyl group, alkoxy group having 1 to 8 carbon atoms or aralkyloxy group having 7 to 12 carbon atoms and other one represents a hydrogen atom or alkyl group having 1 to 8 carbon atoms), wherein the polyolefin composition further comprises tris(2,4-di-t-butylphenyl) phosphite, the weight ratio of the phosphite of the formula (I) to tris(2,4-di-t-butylphenyl)phosphite being 5:1 to 1:10.

2. The process according to claim 1, wherein the polyolefin composition comprises the phosphite of the formula (I) in an amount of 0.005 to 5 parts by weight with respect to 100 parts by weight of the polyolefin.

3. The process according to claim 1, wherein the polyolefin composition comprises the phosphite of the formula (I) in an amount of 0.05 to 1 part by weight with respect to 100 parts by weight of the polyolefin.

4. The process according to claim 1, in which the yellowness index YI thereof is 3 or less.

* * * * *